Oct. 27, 1936.  J. R. SUMMERS  2,058,740
STEERING WHEEL COVER
Filed June 28, 1935
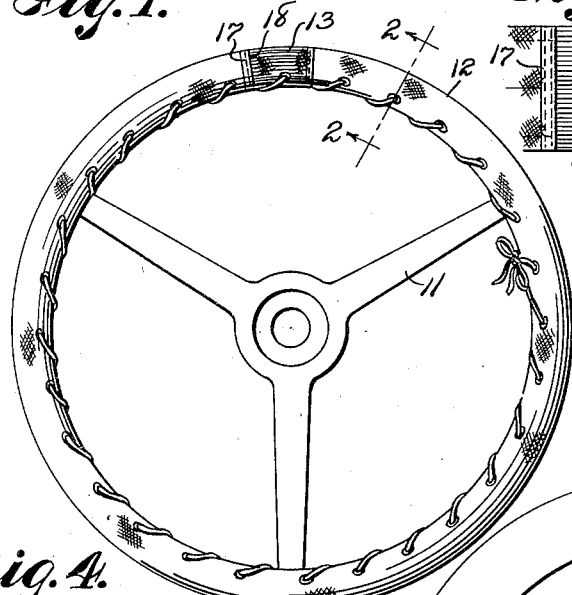
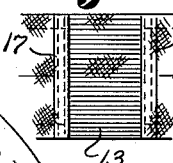
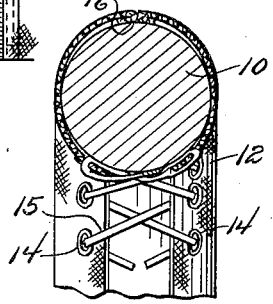
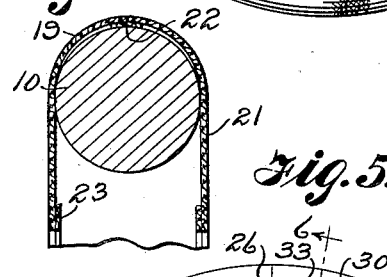
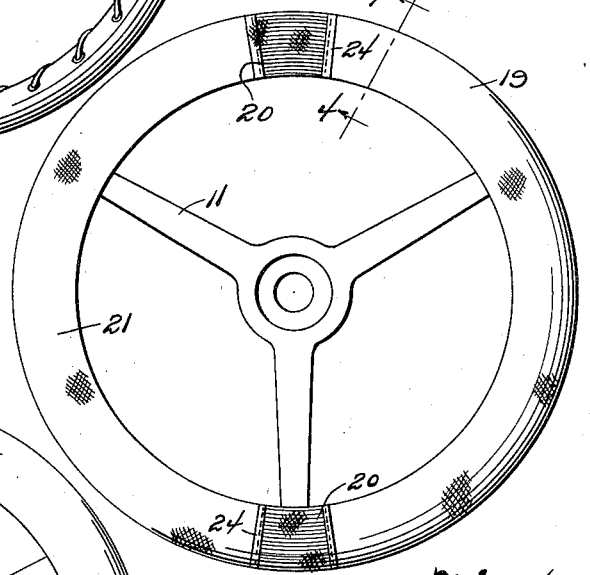
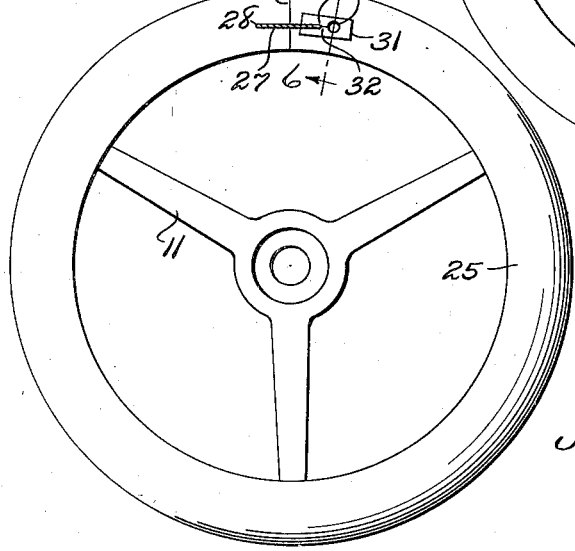
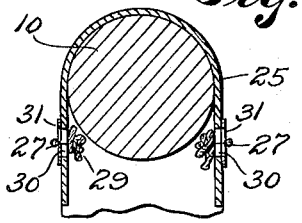
John Royal Summers
INVENTOR
BY Victor J. Evans & Co.
ATTORNEY Patented Oct. 27, 1936

2,058,740

UNITED STATES PATENT OFFICE 2,058,740

STEERING WHEEL COVER

John Royal Summers, Little Rock, Ark., assignor of one-third to Revell Kenneth Covington and one-third to Theodosia Earenstine Covington, Little Rock, Ark.

Application June 28, 1935, Serial No. 28,940

4 Claims. (Cl. 74—558)

This invention relates to covers for automobile steering wheels and has for an object to provide an endless band which may be easily applied to any steering wheel and will protect the hands of the driver from being soiled.

A further object is to provide a cover in which there is an elastic insert or section which permits longitudinal or circumferential stretching of the cover to fit various sizes of steering wheels.

A further object is to provide a cover which will be inextensible circumferentially except at the point where the elastic insert is located so that a tight snug fit between the wheel rim and cover will exist at all times.

A further object is to provide a cover which may be formed of fabric or even paper and which may be easily manufactured and will not easily get out of order.

With the above and other objets in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of a steering wheel cover constructed in accordance with my invention, applied to a steering wheel.

Figure 2 is a cross sectional view taken on the line 2—2 of Figure 1.

Figure 3 is a plan view of a modified form of the invention.

Figure 4 is a cross sectional view taken on the line 4—4 of Figure 3.

Figure 5 is a plan view of another modified form of the invention.

Figure 6 is a cross sectional view taken on the line 6—6 of Figure 5.

Figure 7 is a detail fragmentary plan of one of the elastic sections.

Referring now to the drawing in which like characters of reference designate similar parts in the various views, 10 designates the rim and 11 the spokes of an ordinary steering wheel. The rim cover comprising the subject matter of this invention is preferably formed of an endless band 12 of fabric, the band being split transversely to receive between the edges of the split, an elastic insert or section 13. The elastic section forms a continuation of the band and permits the band to stretch circumferentially at the elastic section to be applied to various sizes of rims. Along the longitudinal edges of the band eyelets 14 are disposed in annular rows to receive a lacing cord 15 by means of which the edges of the band may be drawn toward each other on the inside of the rim to secure the cover snugly to the rim.

Preferably the cover is formed of two annular strips of fabric sewed together at their outer peripheral edges, the seam 16 being turned inwardly and engaging the rim in the plane of the spokes as shown in Figures 2 and 4. The elastic section 13 is preferably formed of textile material having rubber cords incorporated therein, the material preferably being of the same color as the material of the endless band for the sake of appearance. The insert is sewed at the edges to the edges of the band at the split, as indicated at 17 in Figure 1 and to prevent transverse stretching of the section, strips of inextensible binding tape 18 are sewed over the junctures or seams between the band and elastic section. Preferably these binding strips are disposed on the outside of the elastic section for the sake of appearance.

As shown in Figure 3 the endless band 19 is split at diametrically opposite points and at these points is provided with elastic inserts or sections 20 which form continuations of the band and permit the band to stretch circumferentially to accommodate various sizes of rims. The band in this instance may be formed of comparatively inexpensive material such as canvas or linen annular strips 21, the strips being sewed together at the outer peripheral edges and the seam 22 turned inwardly as best shown in Figure 4. In this embodiment of the invention the lacing cord is dispensed with and the edges of the band are reenforced by inextensible strips 23 of binding tape disposed on the insides of the band. These strips prevent circumferential stretching of the band except at the inserts 20 and of course are interrupted at the inserts so as not to interfere with the free stretching of the inserts longitudinally. In this embodiment also the inserts are held against transverse stretching by means of inextensible strips 24 of binding material sewed over the seams at the junctures of the inserts with the transverse edges of the splits in the endless band.

In Figure 5 there is shown a modification of the invention in which the cover 25 is formed of an endless band of paper split transversely as shown at 26, the ends of the split portion being telescopically movable to adapt the band to receive various sizes of rims. Elastic cords 27 connect the ends of the band together and hold the band snugly upon the rim. The cords are arranged on each side of the band as shown best in Figure 6 and to permit removal of the band one end of each cord is secured permanently to one end of the band by being passed through an opening 28 and glued or otherwise fixed to the inside of the band. The opposite end of the cord is provided with a knot 29 which is passed through an opening 30 formed in a reenforcing strip 31, the cord being then drawn through a lateral slot 32 and lodged in an opening 33 of sufficient diameter to snugly receive the cord. Thus when it is desired to detach the cover it is simply necessary to stretch the cord until the knot 29 will pass through the opening 30 whereupon the ends of the cover are free to permit easy removal of the cover from the rim.

From the above description it is thought that the construction and operation of my invention will be fully understood without further explanation.

What is claimed is:

1. A steering wheel cover comprising an endless band of substantially inelastic material of arcuate cross section having an elastic arcuate longitudinal section stretchable circumferentially of the band and forming a continuation of the band, and means confining the section against stretching transversely of the band.

2. A cover for steering wheels comprising an annular band of fabric split transversely, an elastic arcuate insert connecting the edges of the split in the band and forming a continuation of the band, and inextensible strips reenforcing the junctures of the insert and band and preventing transverse stretching of the insert.

3. A cover for steering wheels comprising an endless band of arcuate cross section and formed of substantially inextensible material an elastic longitudinal arcuate section forming a continuation of the band and permitting circumferential stretching of the band, lacing connecting the side edges of the band, and inextensible binding strips on said section extending transversely across the band and preventing transverse stretching of the elastic section.

4. A cover for steering wheels comprising an endless band of fabric split transversely from longitudinal edge to longitudinal edge, an elastic longitudinal insert sewed at the edges to the edges of the split in the band and forming a continuation of the band, and inextensible strips of fabric reenforcing the seams at the junctures of the insert with the band and preventing transverse stretching of the insert.

JOHN ROYAL SUMMERS.